(12) United States Patent
Lin et al.

(10) Patent No.: US 10,044,269 B2
(45) Date of Patent: Aug. 7, 2018

(54) SWITCHING CONVERTER WITH IMPROVED RECOVERY TIME

(71) Applicant: Powerventure Semiconductor Limited, London (GB)

(72) Inventors: Yu-Ta Lin, New Taipei (TW); Yuan-Wen Hsiao, Hsinchu (TW)

(73) Assignee: Dialog Semiconductor (UK) Limited, London (GB)

( * ) Notice: Subject to any disclaimer, the term of this patent is extended or adjusted under 35 U.S.C. 154(b) by 69 days.

(21) Appl. No.: 15/224,788

(22) Filed: Aug. 1, 2016

(65) Prior Publication Data

US 2017/0315578 A1   Nov. 2, 2017

(30) Foreign Application Priority Data

Apr. 30, 2016  (GB) .................................. 1607622.6

(51) Int. Cl.
*H02M 3/158* (2006.01)
*G05F 3/26* (2006.01)

(52) U.S. Cl.
CPC ............ *H02M 3/158* (2013.01); *G05F 3/262* (2013.01)

(58) Field of Classification Search
CPC ........ H02M 3/155–3/1588; H02M 2003/1566; G05F 3/262
See application file for complete search history.

(56) References Cited

U.S. PATENT DOCUMENTS

| | | | |
|---|---|---|---|
| 4,961,048 A | 10/1990 | Banura | |
| 5,912,552 A * | 6/1999 | Tateishi | H02M 3/1588 323/224 |
| 6,492,796 B1 * | 12/2002 | Morley | G05F 3/262 323/316 |
| 7,764,526 B1 * | 7/2010 | Xing | H02M 3/07 363/60 |
| 8,358,117 B1 * | 1/2013 | Chui | H02M 3/1563 323/224 |
| 9,680,483 B2 * | 6/2017 | Tsunoda | H03L 7/0895 |
| 9,774,255 B2 * | 9/2017 | Xi | H02M 3/157 |

(Continued)

FOREIGN PATENT DOCUMENTS

EP  2680420  1/2014

OTHER PUBLICATIONS

"A New Digital Control Algorithm to Achieve Optimal Dynamic Performance in DC-to-DC Converters," by Guang Feng et al, IEEE Transactions on Power Electronics, vol. 22, No. 4, Jul. 2007, pp. 1489-1498.

*Primary Examiner* — Yusef A Ahmed
(74) *Attorney, Agent, or Firm* — Saile Ackerman LLC; Stephen B. Ackerman

(57) ABSTRACT

A switching converter, which produces an output voltage, contains a switch operable between a first state for opposing a decrease in the output voltage and a second state for opposing an increase in the output voltage. The converter also contains a circuit adapted to determine a time period during which the output voltage is decreasing, wherein during the time period the switch is in the first state. The circuit also calculates, based on the time period, a time to turn the switch from the first state to the second state to prevent the output voltage increasing above a reference value. Optionally, the time to turn the switch to the second state is based on a duty cycle of the converter.

22 Claims, 7 Drawing Sheets

(56) References Cited

U.S. PATENT DOCUMENTS

| | | | |
|---|---|---|---|
| 9,806,617 B1* | 10/2017 | Ozawa | H02M 3/158 |
| 9,837,899 B2* | 12/2017 | Li | H02M 3/157 |
| 2002/0057082 A1* | 5/2002 | Hwang | H02M 3/158 |
| | | | 323/284 |
| 2003/0020442 A1* | 1/2003 | Hwang | H02M 1/0845 |
| | | | 323/288 |
| 2003/0021128 A1 | 1/2003 | Brkovic | |
| 2003/0197245 A1 | 10/2003 | Zhang | |
| 2006/0055465 A1* | 3/2006 | Lin | G05F 3/262 |
| | | | 330/288 |
| 2007/0103132 A1* | 5/2007 | Hendrix | H02J 1/102 |
| | | | 323/282 |
| 2007/0222395 A1* | 9/2007 | Chen | H02M 3/1563 |
| | | | 315/224 |
| 2008/0084196 A1 | 4/2008 | Lacombe et al. | |
| 2008/0252277 A1* | 10/2008 | Sase | H02M 3/157 |
| | | | 323/283 |
| 2009/0153114 A1* | 6/2009 | Huang | H02M 3/1584 |
| | | | 323/282 |
| 2009/0322299 A1* | 12/2009 | Michishita | H02M 3/156 |
| | | | 323/282 |
| 2010/0134079 A1* | 6/2010 | Liu | H02M 3/156 |
| | | | 323/282 |
| 2010/0237845 A1* | 9/2010 | Scaldaferri | H02J 7/0052 |
| | | | 323/299 |
| 2011/0031948 A1* | 2/2011 | Chien | H02M 3/1588 |
| | | | 323/282 |
| 2011/0292699 A1* | 12/2011 | Goerke | H02M 1/15 |
| | | | 363/84 |
| 2012/0112721 A1* | 5/2012 | Wu | H02M 3/156 |
| | | | 323/288 |
| 2013/0200864 A1* | 8/2013 | Huang | H02M 3/156 |
| | | | 323/271 |
| 2013/0257484 A1* | 10/2013 | Rafati | H02M 11/00 |
| | | | 327/103 |
| 2013/0285634 A1* | 10/2013 | Bianco | H02M 3/1563 |
| | | | 323/283 |
| 2014/0167716 A1* | 6/2014 | Chen | H02M 3/156 |
| | | | 323/271 |
| 2014/0184180 A1* | 7/2014 | Kronmueller | G05F 1/595 |
| | | | 323/271 |
| 2014/0266117 A1* | 9/2014 | Goncalves | H02M 3/158 |
| | | | 323/283 |
| 2015/0207513 A1* | 7/2015 | Tsunoda | H03L 7/0895 |
| | | | 327/66 |
| 2015/0378386 A1* | 12/2015 | Li | H03F 3/2171 |
| | | | 323/315 |
| 2016/0087530 A1* | 3/2016 | Gambetta | H02M 3/158 |
| | | | 323/271 |
| 2016/0094124 A1* | 3/2016 | Al-Shyoukh | G05F 3/242 |
| | | | 323/271 |
| 2016/0187914 A1* | 6/2016 | Li | H02M 1/14 |
| | | | 323/313 |
| 2016/0329734 A1* | 11/2016 | Lee | H02M 3/156 |
| 2016/0359414 A1* | 12/2016 | Ozanoglu | H02M 3/1582 |
| 2017/0093278 A1* | 3/2017 | Unno | H02M 3/156 |
| 2017/0163150 A1* | 6/2017 | Xi | H02M 3/157 |
| 2017/0201174 A1* | 7/2017 | Li | H02M 3/157 |
| 2017/0207703 A1* | 7/2017 | Houston | H02M 3/1582 |
| 2017/0212538 A1* | 7/2017 | Al-Shyoukh | G05F 1/46 |

* cited by examiner

SWITCHING CONVERTER WITH IMPROVED RECOVERY TIME

TECHNICAL FIELD

The present disclosure relates to apparatus and methods for regulating an output of a switching converter. In particular, the present invention relates to a buck converter having an optimized recovery time.

BACKGROUND

Converters are commonly used in the field of power supplies. Modern advanced process technologies have been used to deliver increasingly compact devices. However, these advances have also lead to a decrease in tolerance for overstress due to variation in load current.

When a load current of a converter increases steeply, a feedback loop can be used to track the load and minimize occurrence of an output undershoot voltage. A number of synchronised converter topologies have been proposed to address this issue. However, present solutions still present a number of limitations including the generation of an output voltage overshoot and relatively poor recovery time.

SUMMARY

It is an object of the invention to address one or more of the above mentioned limitations. According to a first aspect of the disclosure, there is provided a converter for outputting an output voltage comprising a switch operable between a first state for opposing a decrease in the output voltage and a second state for opposing an increase in the output voltage; and a circuit adapted to determine a time period during which the output voltage is decreasing, wherein during the time period the switch is in the first state; and to calculate, based on the time period, a time to turn the switch from the first state to the second state to prevent the output voltage increasing above a reference value.

Optionally, the time to turn the switch to the second state is based on a duty cycle of the converter.

Optionally, the circuit comprises a memory device coupled to the switch, the memory device having a first input coupled to a first circuit, a second input coupled to a second circuit, and an output to output a signal to turn the switch to the second state.

Optionally, the first circuit is adapted to detect a gradient of the output voltage, and to output a first signal proportional to the time period based on the gradient.

Optionally, the first circuit comprises a first comparator adapted to detect a negative gradient of the output voltage; a second comparator adapted to detect a positive gradient of the output voltage; and a memory device comprising a first input coupled to an output of the first comparator, a second input coupled to an output of the second comparator; and an output to output a signal proportional to the time period.

Optionally, the second circuit comprises an input for receiving a signal proportional to the time period and an output to output a signal proportional to another time period based on the duty cycle of the converter.

Optionally, the second circuit comprises a current generator, a capacitor coupled to the current generator, and a comparator having an input coupled to the capacitor and an output coupled to a logic gate; wherein the current generator is adapted to output a current to control a rate of discharge of the capacitor.

Optionally, the current generator is adapted to output a current proportional the square root of an input current.

Optionally, the current generator is adapted to output a current proportional to the inverse of the square root of the duty cycle.

Optionally, the current generator comprises an input current generator for generating the input current; an operational amplifier adapted to control an output switch; and a current mirror coupled to an input of the operational amplifier.

Optionally, the current mirror comprises a first transistor and a second transistor, and wherein a size of the second transistor is four times as large as a size of the first transistor.

Optionally, the current generator comprises a digital circuit adapted to receive a voltage value and to generate a digital value proportional to the inverse of the square root of the voltage value.

According to a second aspect of the disclosure, there is provided a method of regulating an output voltage of a converter comprising: providing a switch operable between a first state for opposing a decrease in the output voltage and a second state for opposing an increase in the output voltage; determining a time period during which the output voltage is decreasing, wherein during the time period the switch is in the first state; calculating, based on the time period, a time to turn the switch from the first state to the second state to prevent the output voltage increasing above a reference value; switching the switch to the second state at the calculated time.

Optionally, the calculated time is based on a duty cycle of the converter.

Optionally, detecting the time period comprises detecting a gradient of the output voltage.

Optionally, detecting a gradient comprises detecting a negative gradient of the output voltage and detecting a positive gradient of the output voltage.

Optionally, calculating the time comprises generating a current proportional to the square root of an input current.

Optionally, calculating the time comprises generating a current proportional to the inverse of the square root of the duty cycle.

Optionally, calculating the time comprises receiving a voltage value and generating a digital value proportional to the inverse of the square root of the voltage value.

Optionally, the method comprises providing a memory device coupled to the switch, the memory device having a first input coupled to a first circuit, a second input coupled to a second circuit, and an output to output a signal to turn the switch to the second state.

Optionally, the second circuit comprises an input for receiving a signal proportional to the time period and an output to output a signal proportional to another time period based on the duty cycle of the converter.

Optionally, the second circuit comprises a current generator, a capacitor coupled to the current generator, and a comparator having an input coupled to the capacitor and an output coupled to a logic gate; wherein the current generator is adapted to output a current to control a rate of discharge of the capacitor.

Optionally, the current generator comprises an input current generator for generating the input current; an operational amplifier adapted to control an output switch; and a current mirror coupled to an input of the operational amplifier.

Optionally, the current mirror comprises a first transistor and a second transistor, and wherein a size of the second transistor is four times as large as a size of the first transistor.

BRIEF DESCRIPTION OF THE DRAWINGS

The invention is described in further detail below by way of example and with reference to the accompanying drawings, in which.

DESCRIPTION

Figure 1:
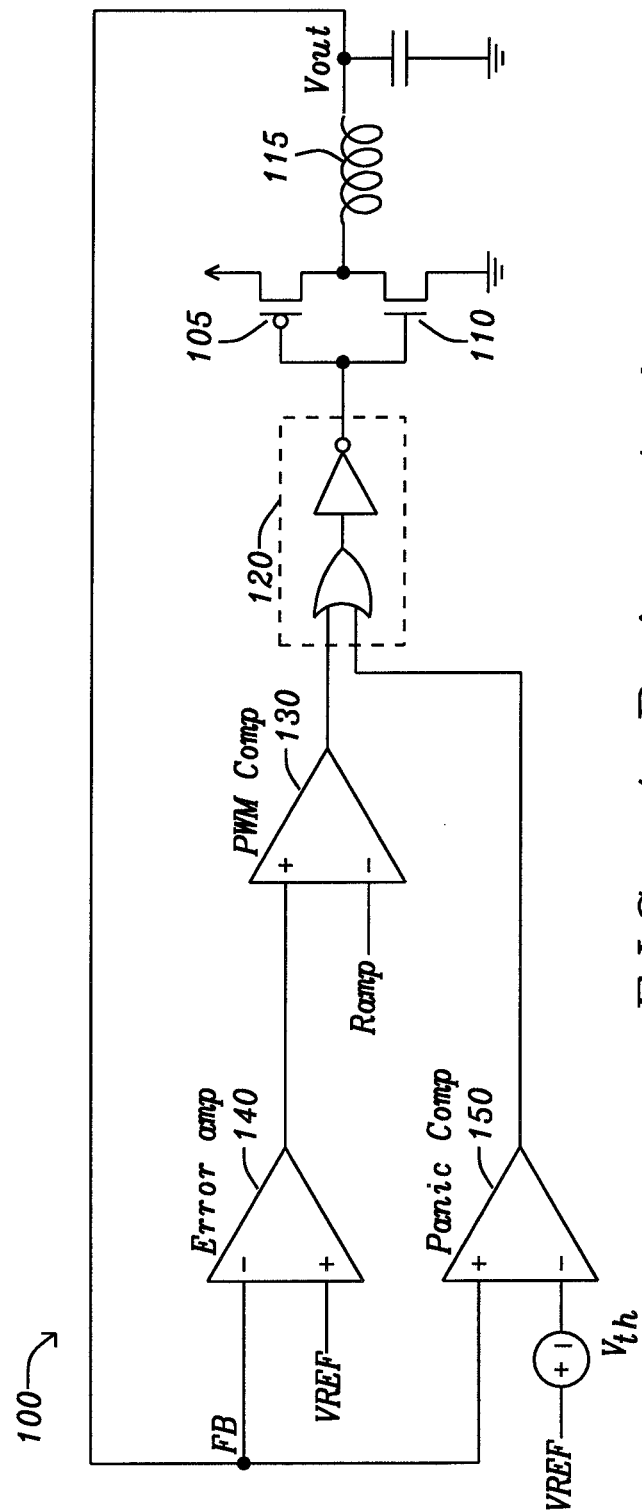
FIG. 1 is a diagram of a switching converter.

FIG. 1 illustrates a switching converter 100 according to the prior art. The converter includes a high side power switch 105, a low side power switch 110, an inductor 115, a gate driver 120, and an output regulation loop for regulating an output voltage of the converter.

The gate drive 120 includes an OR gate having a first and a second input and one output coupled to a NOT gate.

The output regulation loop includes a first arm connected to the first input of the gate driver and a second arm connected to the second input of the gate driver.

The first arm includes a Pulse Width Modulation PWM comparator 130 and an error amplifier 140. The error amplifier 140 has an inverting input for receiving an output voltage Vout of the converter, a non-inverting input for receiving a reference Voltage Vref, and one output.

The Pulse Width Modulation PWM comparator 130 has a non-inverting input for receiving the output of the error amplifier 140, an inverting input for receiving a ramp Voltage Vramp, and one output coupled to the first input of the gate driver 120.

The second arm includes a panic comparator 150 having a non-inverting input for receiving the feedback voltage Vout of the converter and an inverting input for receiving a reference voltage Vref. The output of the panic comparator is connected to the second input of the gate driver 120.

Figure 2:
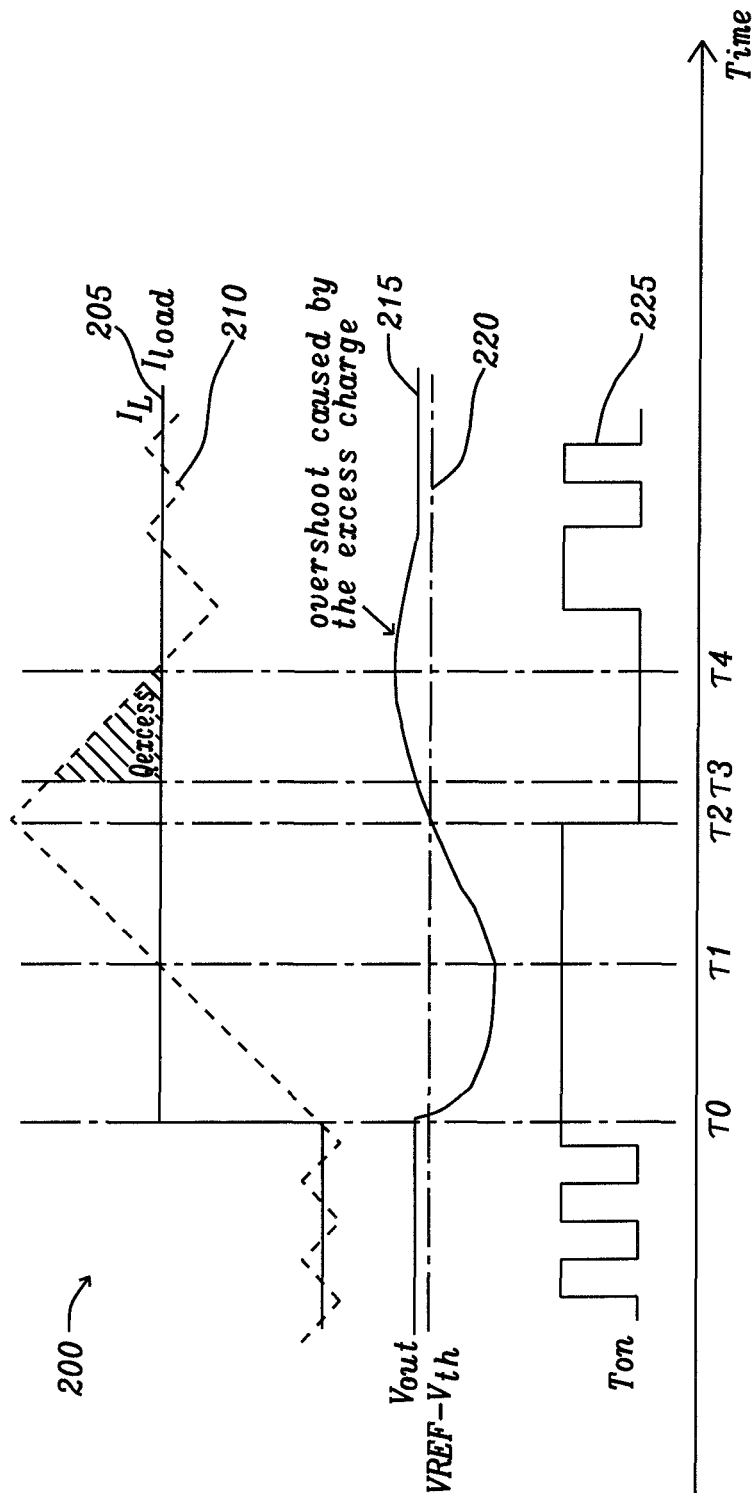
FIG. 2 is a timing chart illustrating the working of the converter of FIG. 1.

FIG. 2 shows a timing chart illustrating the working of the converter of FIG. 1. The chart includes the profiles of a current load 205, an inductor current 210, a converter voltage output 215, a difference voltage Vref-Vth 220, and an ON-time signal 225 of the high switch.

At time t=t0, the load current 205 increases, leading to a decrease in Vout 215. The decrease in Vout is detected by the panic comparator 150. When the drop in output voltage is below a given threshold, the comparator 150 outputs a signal which turns the high side switch 105 ON (switch closed) to oppose the decrease in output voltage.

At time t=t1 the inductor current 210, becomes larger than the load current 205.

At time t=t2, the output voltage recovers back to a voltage Vref-Vth. At this point the comparator 150 outputs a signal which turns the high side switch 105 off to oppose the increase in output voltage. The inductor current 210 reaches its maximum value.

Between time t=t2 and t4, the output voltage 215 keeps increasing.

A drawback of this method is that if the high side switch 105 is turned off before the drop detected by panic comparator 150; then when the undershoot voltage is detected, it is late to turn on the high side switch.

Besides, using this approach, the high side switch 105 remains turned on until the voltage is back to the setting threshold voltage. During the period of time t4–t3, the inductor current 210 contributes to an excess charge Qexcess leading to an output voltage overshoot.

Figure 3:
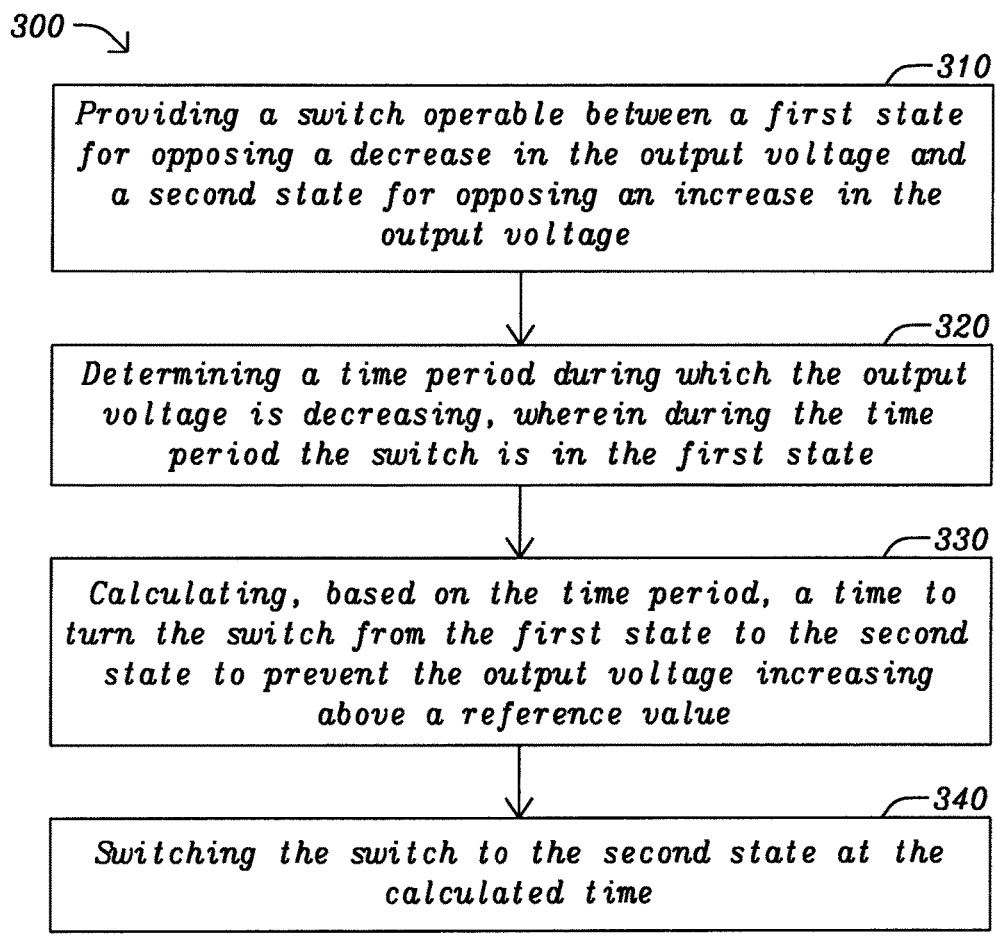
FIG. 3 is a flow diagram of a method of regulating an output voltage of a converter.

FIG. 3 shows a flow diagram of a method of regulating an output voltage of a converter, when a load current is changing.

At step 310, the method provides a switch. The switch is operable between a first state for opposing a decrease in the output voltage and a second state for opposing an increase in the output voltage.

At step 320, the method determines a time period during which the output voltage is decreasing. During the time period the switch is in the first state.

At step 330, the method calculates, based on the time period, a time to turn the switch from the first state to the second state to prevent the output voltage increasing above a reference value. For example, the reference value may be a value of the output voltage of the converter before occurrence of an increase in the current load.

At step 340, the switch is switched to the second state at the calculated time.

Figure 4:
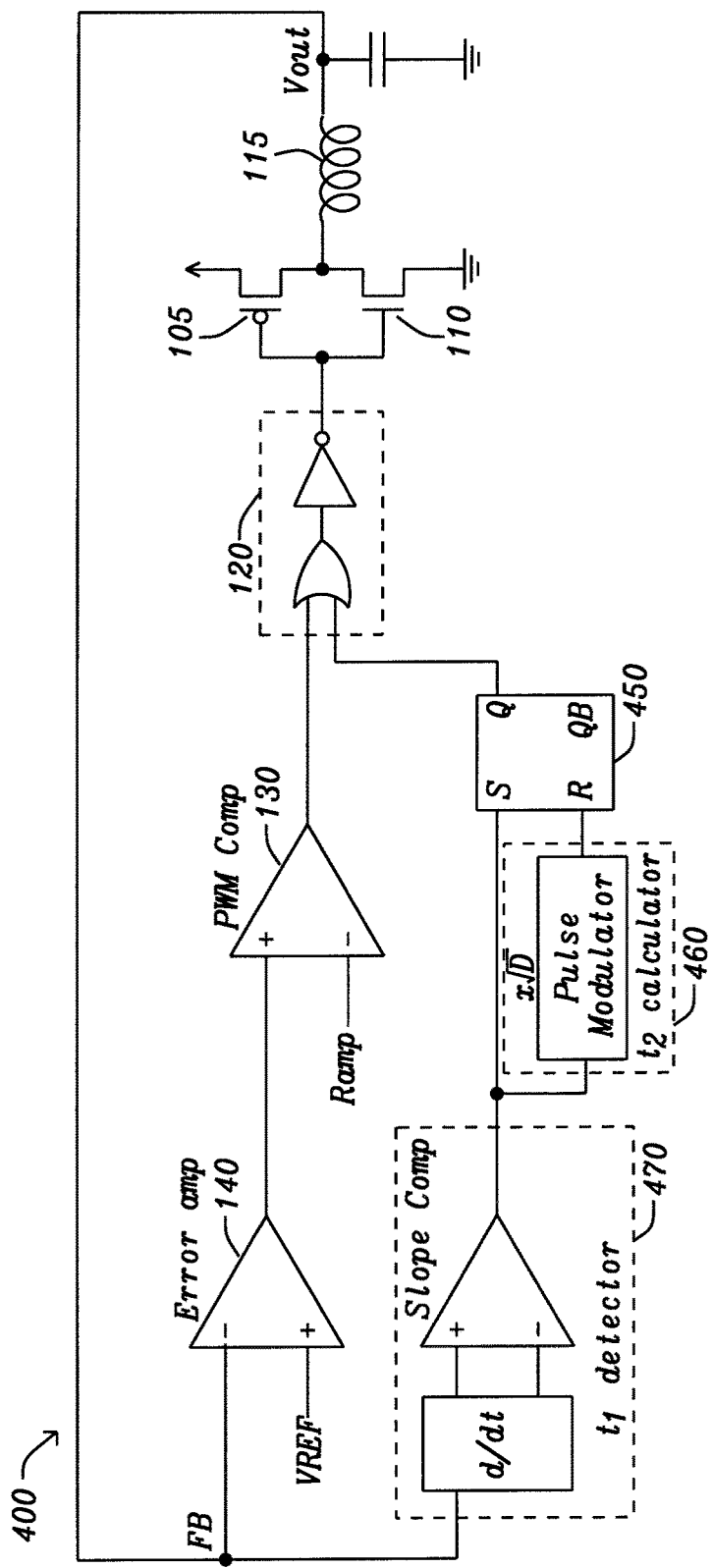
FIG. 4 is a diagram of a converter according to an exemplary embodiment of the disclosure.

FIG. 4 illustrates a switching converter 400 for implementing the method illustrated in FIG. 3. The converter includes a high side power switch 105, a low side power switch 110, an inductor 115, a gate driver 120, and an output regulation loop for regulating an output voltage of the converter.

The gate drive 120 includes an OR gate having a first and a second input and one output coupled to a NOT gate.

The output regulation loop includes a first arm connected to the first input of the gate driver and a second arm connected to the second input of the gate driver.

The first arm includes a Pulse Width Modulation PWM comparator 130 and an error amplifier 140. The error amplifier 140 has an inverting input for receiving an output voltage Vout of the converter, a non-inverting input for receiving a reference Voltage Vref, and one output.

The Pulse Width Modulation PWM comparator 130 has a non-inverting input for receiving the output of the error amplifier 140, an inverting input for receiving a ramp Voltage Vramp, and one output coupled to the first input of the gate driver 120.

The second arm includes a memory circuit 450, such as a latch or a flip-flop, a pulse modulator 460, and a slope comparator 470, also referred to as slope detector. The memory circuit 450 has two inputs for receiving a set and reset signal, and an output. The slope comparator 470 has an input for receiving the output voltage Vout of the converter and one output for issuing a logic signal. The pulse modulator 460 has an input connected to the output of the slope comparator 470 and one output for issuing a logic signal, connected to the reset input of the memory circuit 450. The set input of the memory circuit 450 is connected to the output of the slope comparator 470. The output of the memory circuit 450 is connected to the second input of the gate driver 120.

In operation, the output voltage Vout of the converted is regulated by both the signal output of the first arm and the signal output of the second arm which controls the actuations of the high and low power switches 105, 110 via the gate driver 120.

The signal output of the first arm is a PWM signal output from the comparator 130, and the signal output of the second arm is a logic signal from the memory circuit 450.

The OR gate returns a high output if it receives at least one high input, for example a logic 1, from either the output signal of the first arm or the output of the second arm. In this case, the high output is converted into a low output by the inverter, leading to the high switch 105 being ON (closed).

The OR gate returns a low output if it receives a low input, for example a logic 0, from both the output signal of the first arm and the output of the second arm. In this case, the low output is converted into a high output by the inverter, leading to the high switch 105 being OFF (open).

Figure 5:
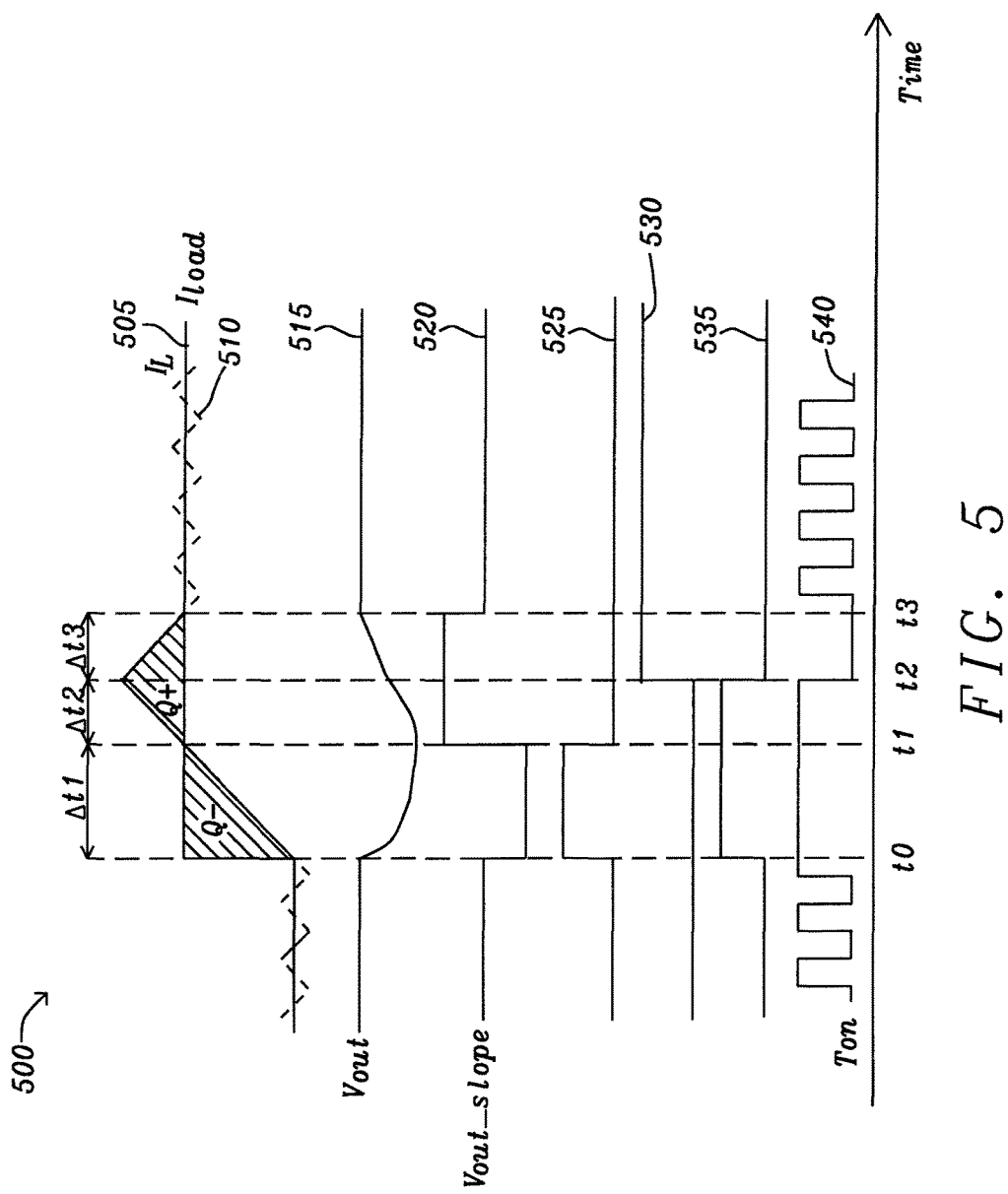
FIG. 5 is a timing chart illustrating the working of the converter of FIG. 4.

FIG. 5 shows a timing chart illustrating the working of the converter of FIG. 4. The chart includes the profiles of a current load 505, an inductor current 510, a converter voltage output 515, a slope 520 of the converter voltage output, an output logic signal 525 of the slope comparator 470, an output logic signal 530 of the pulse modulator 460, an output logic signal 535 of the memory circuit 450, and an ON-time signal 540 of the high switch 105.

At time t=0, the load current 505 increases, leading to a decrease in Vout 515. The slope 520, also referred to as gradient of the output voltage is negative. The decrease in Vout is detected by the slope comparator 470 which outputs a high logic signal. As a result, the output of the memory circuit 450 of FIG. 4 is high and the output of the gate driver 120 is low, hence turning the high side switch 105 ON (switch closed), to increase the voltage Vout.

If the high side switch 105 is turned ON before t0, as shown in FIG. 5, it will remain turned ON after t0. If the high side switch is turned OFF before t0 , it will be turned ON at t=t0.

The output voltage 515 keeps decreasing for a duration $\Delta t1 = t1 - t0$.

At time t1, Vout starts increasing and the slope 520 of the output voltage becomes positive. At this point the slope comparator 470 outputs a low output logic signal. The pulse modulator 460 calculates a time duration $\Delta t2 = t2 - t1$ where t2 is a time at which the high side switch 105 should be turned OFF (switch open) in order to prevent a voltage overshoot.

For example, the time duration $\Delta t2$ can be calculated by comparing a first charge $Q_-$, with a second charge $Q_+$.

The inductor current 510 forms ripples having positive and negative portions with respect to the current load 505. Negative portions of the ripple remove a charge $Q_-$ from an output capacitor of the converter, and positive portions of the ripple add a charge $Q_+$ to the output capacitor.

During the time $\Delta t1$, a charge $Q_-$ is defined as:

$$Q_- = \frac{1}{2} * \left(\frac{Vin - Vout}{L}\right) * (\Delta t_1)^2 \quad (1)$$

Where L is the value of the inductor in the converter. During the time interval t3−t1, a charge $Q_+$ is defined as:

$$Q_+ = \frac{1}{2} * \left(\frac{Vin - Vout}{L}\right) * \left(\frac{Vin}{Vout}\right) * (\Delta t_2)^2 \quad (2)$$

The time duration $\Delta t2$ can be derived from equations 1 and 2 above by considering the condition $Q_- = Q_+$.

In this case the time duration $\Delta t2$ is given by:

$$\Delta t_2 = \sqrt{\frac{Vout}{Vin}} * \Delta t_1 = \sqrt{D} * \Delta t_1 \quad (3)$$

Where D is to the duty cycle of the converter.

Hence, the time t2 at which the high side switch 105 should be turned off in order to prevent an output voltage overshoot, is based on the time duration $\Delta t1$ times the square root of the duty cycle D.

At time t3, the output voltage Vout returns to its original value, before the occurrence of the increase in load current.

At time t>t3 the DC value of the output voltage remains substantially constant; there is no output voltage overshoot.

The time duration, also referred to as time period $\Delta t1 = t1 - t0$ can be detected by the slope comparator 470. For example, the slope comparator 470 may identify a start of a decreasing output value and the start of an increasing output value.

Figure 6:
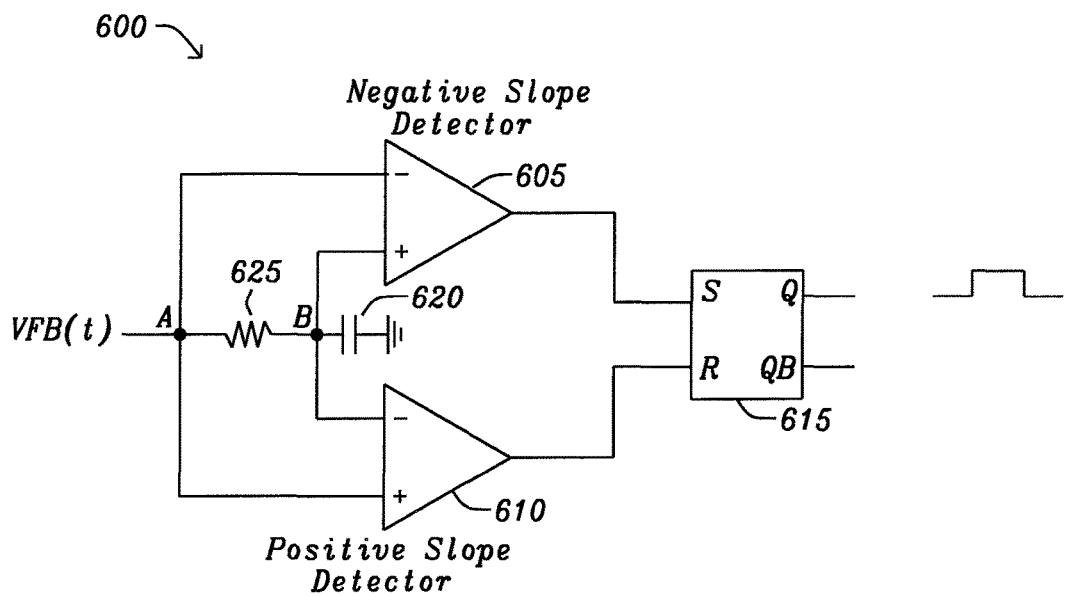
FIG. 6 is a diagram of a slope detector.

FIG. 6 shows an example of a slope comparator, also referred to as slope detector adapted to differentiate between a negative gradient and a positive gradient of the output voltage. The slope detector 600 has an input for receiving a feedback voltage Vfb and two outputs noted Q and QB respectively, for outputting a logic signal. The slope detector includes a first comparator 605 and a second comparator 610 coupled to a memory circuit 615. Each comparator has an inverting input, a non-inverting input and one output. The inverting input of the first comparator 605 and the non-inverting input of the second comparator 610 are both connected to the same input at node A, for receiving the feedback voltage Vfb. The inverting input of the second comparator 610 is coupled to the non-inverting input of the first comparator 605 at node B. A capacitor 620 has a first terminal connected to a ground and a second terminal connected to node B. A resistor 625 is connected at one end to node A and at another end to node B.

The memory circuit 615 has a two inputs referred to as set input and reset input, and two outputs noted Q and QB respectively. QB is the complement of Q. The output of the first comparator 605 is connected to the set input. The output of the second comparator 610 is connected to the reset input.

In operation at time t=t0, Vout starts decreasing. At this point the first comparator 605 outputs a high signal (logic 1) while the second comparator 610 outputs a low signal (logic 0). The output of the memory circuit is set to 1 and remains so until the time t=t1, when Vout starts decreasing. At this point, the first comparator 605 outputs a low signal (logic 0) while the second comparator 610 outputs a high signal (logic 1) which reset the output of the memory circuit 615. As a result, the memory circuit 615 holds the logic value 1 for the time duration $\Delta t1 = t1 - t0$.

The RC circuit formed by resistor 625 and capacitor 620 is used to obtain a delay between the voltage at node A and the voltage at node B. If the output voltage is rising, the voltage VFB at node A is rising faster than the voltage VB at node B. If the output voltage is falling, the voltage VFB at node A is falling faster than the voltage VB at node B. In this way, this circuit can detect when the output voltage is rising or falling.

Figure 7:
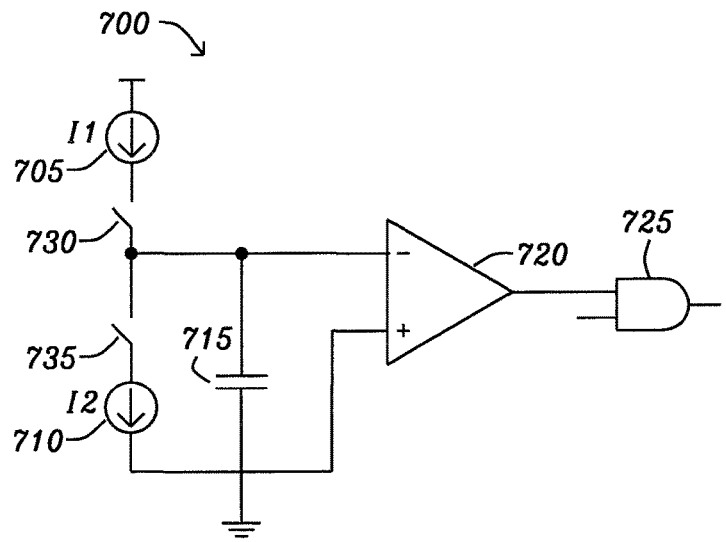
FIG. 7 is a diagram of a pulse modulator.

FIG. 7 shows an example of a pulse modulator. The pulse modulator 700 includes a first current generator 705 for generating a constant current, a second current generator 710 for generating a current proportional to the inverse of the square root of the duty cycle, a capacitor 715, a comparator 720, an AND gate 725 and first and second switches 730 and 735 respectively.

The first current generator 705 is coupled in series with the capacitor 715 via a first switch 730. The second current generator 710 and the second switch 735 are coupled in parallel with the capacitor 715. The comparator 720 has an inverting input coupled to a first terminal of the capacitor 715, and a non-inverting input coupled to a second terminal of the capacitor 715. The second terminal of the capacitor 715 is connected to a ground. The AND gate 725 has a first input for receiving an output of the comparator 720, and a second input for receiving a logic signal. For example, the logic signal may be the output signal QB of slope comparator 600 of FIG. 6. The AND gate has an output for outputting a signal indicative of the time duration Δt2.

In operation, the pulse modulator 700 is operated as follows. At time t0, the first switch 730 is closed. During the length of time Δt1, a first constant current I1 generated by the current generator 705 charges the capacitor 715.

At time t1, the first switch 730 is open and the second switch 735 is closed. A second current I2 generated by the current generator 710, is used to discharge the capacitor 715. By controlling the current I2, it is possible to control a rate of voltage change across the capacitor 715, hence to control the rate of discharge of the capacitor. The current I2 is proportional to the inverse of the square root of the duty cycle, and discharge the capacitor in a length of time Δt2. In this way the desired dependence between Δt1 and Δt2 can be approached. The pulse modulator 700 outputs a logic signal 530 which remains low (logic 0) until t2.

Figure 8:
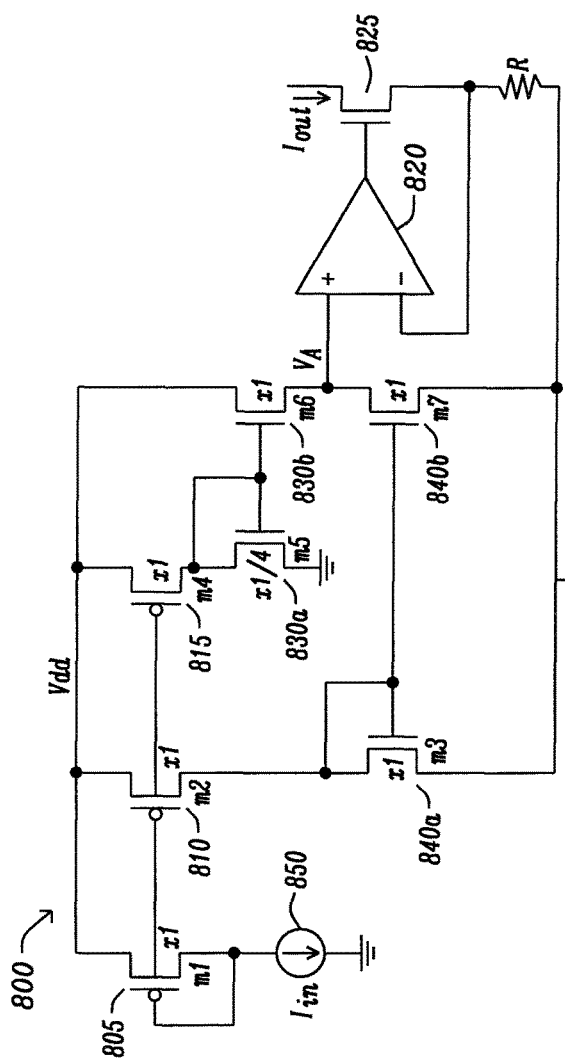
FIG. 8 is a diagram of a current circuit.

FIG. 8 shows a possible embodiment for the second generator 710 also referred to as current circuit.

The current circuit has three pMOS transistors referred to as first 805, second 810, and third 815 pMOS transistor; an operational amplifier 820, a nMOS transistor 825, a first 830 and a second 840 current-mirror, and a current generator 850. The first current mirror has a first nMOS transistor 830a and a second nMOS transistor 830b. The first nMOS transistor 830a has a size four time smaller than the size of the second nMOS transistor 830b. The second current mirror has a first nMOS transistor 840a and a second nMOS transistor 840b.

The three pMOS transistors have a source for receiving a rail voltage Vdd and a gate coupled with the current generator. The first pMOS transistor 805 has a drain coupled with the current generator 850. The second pMOS transistor 810 has a drain coupled with a drain of the transistor 840a of the first current mirror. The third pMOS transistor has a drain coupled with the transistor 830a of the second current mirror.

The nMOS transistor 830b has a drain coupled with the sources of pMOS transistors 805, 810 and 815; and a source coupled with a drain of the nMOS transistor 840b.

The operational amplifier 820 has a non-inverting input coupled to a resistance, and an inverting input coupled to a node A, formed by the source of the nMOS transistor 830b and the drain of the transistor 840b.

The operational amplifier 820 has an output coupled with a gate of the nMOS transistor 825.

In operation, the current Iin generated by current generator 850 is passing through the first, second and third pMOS transistors 805, 810 and 815. As a result, the same current Iin is passing through the first nMOS transistor 830a of the first current mirror, and through the first nMOS transistor 840a of the second current mirror. Hence current Iin also passes through the second nMOS transistor 840b.

The current passing through the transistor 830b is determined by the current passing through transistor 840a. The gate voltage of 830b is determined by the gate voltage of 830a. The Voltage source of the nMOS transistor 830b can be derived from standard Equation of the drain-source current Ids current of a nMOS transistor.

The node A has a voltage $V_A$ defined as $$V_A = \sqrt{\frac{Iin}{\mu_n C_{ox} \frac{W}{L}}} \quad (4)$$

where Iin is an input current generated by the current generator 850, $\mu_n$ is the charge mobility of an nMOS transistor, $C_{ox}$ the gate capacitance per unit area of oxide, and W/L the channel width to length ratio.

The output current Iout is proportional to the square root of the input current and can be derived from $V_A$ as:

$$Iout = V_A / R = \sqrt{\frac{Iin}{\mu_n C_{ox} \frac{W}{L}}} / R \quad (5)$$

The current Iin can be set to a desired value. By setting Iin to a value proportional to the inverse of the Duty cycle; Iout is then proportional to the inverse of the square root of the Duty cycle.

Figure 9:
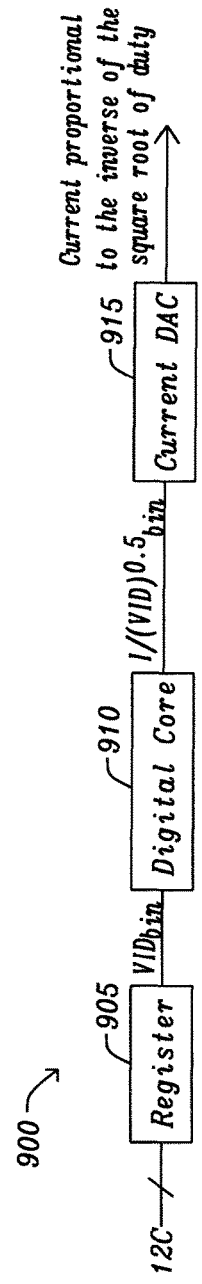
FIG. 9 is a diagram of another current circuit.

FIG. 9 shows another embodiment for the second generator of FIG. 7. In this case the generator is provided by a digital circuit 900 comprising a register 905, a digital core 910 and a current digital to analog converter 915. The register 905 has an input for connecting to an Inter-Integrated Circuit, I2C, and an output coupled with an input of the digital core 910. The current DAC 915 has an input for receiving an output of the digital core 910 and an output for outputting a current proportional to the inverse of the square root of the duty cycle.

In operation, a reference target for a voltage identifier VID is programmed using an Inter-Integrated Circuit. For example, a user can set the output voltage of the converter via the Inter-Integrated Circuit.

The Inter-Integrated Circuit communicates a voltage identifier VID corresponding to the output voltage of the converter to the register 905. The digital core 910 retrieves the VID digital data from the register 905, calculates an approximation value of the inverse of the square root of VID and outputs a corresponding digital value $$\frac{1}{\sqrt{VID}}.$$

The Current DAC 915 converts the digital value $$\frac{1}{\sqrt{VID}}$$

into a current that is proportional to the inverse of the square root of the duty cycle.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. A converter for outputting an output voltage comprising
a switch operable between a first state for opposing a decrease in the output voltage and a second state for opposing an increase in the output voltage; and
a circuit adapted
to determine a time period during which the output voltage keeps decreasing, wherein during the time period the switch is in the first state; and
to calculate a time to turn the switch from the first state to the second state to prevent the output voltage increasing above a reference value;
wherein the converter has a duty cycle, and wherein the time to turn the switch to the second state is based on a product of a square root of the duty cycle and the time period.

2. The converter as claimed in claim 1, wherein the circuit comprises a memory device coupled to the switch, the memory device having a first input coupled to a first circuit, a second input coupled to a second circuit, and an output to output a signal to turn the switch to the second state.

3. The converter as claimed in claim 2, wherein the first circuit is adapted to detect a gradient of the output voltage, and to output a first signal proportional to the time period based on the gradient.

4. The converter as claimed in claim 3, wherein the first circuit comprises
a first comparator adapted to detect a negative gradient of the output voltage;
a second comparator adapted to detect a positive gradient of the output voltage; and
a memory device comprising a first input coupled to an output of the first comparator, a second input coupled to an output of the second comparator, and an output to output a signal proportional to the time period.

5. The converter as claimed in claim 2, wherein the second circuit comprises an input for receiving a signal proportional to the time period and an output to output a signal proportional to another time period based on the duty cycle of the converter.

6. The converter as claimed in claim 5, wherein the second circuit comprises
a current generator,
a capacitor coupled to the current generator, and
a comparator having an input coupled to the capacitor and an output coupled to a logic gate;
wherein the current generator is adapted to output a current to control a rate of discharge of the capacitor.

7. The converter as claimed in claim 6, wherein the current generator is adapted to output a current proportional to a square root of an input current.

8. The converter as claimed in claim 7, wherein the current generator comprises
an input current generator for generating the input current;
an operational amplifier adapted to control an output switch; and
a current mirror coupled to an input of the operational amplifier.

9. The converter as claimed in claim 8, wherein the current mirror comprises a first transistor and a second transistor, and wherein a size of the second transistor is four times as large as a size of the first transistor.

10. The converter as claimed in claim 6, wherein the current generator is adapted to output a current proportional to an inverse of a square root of the duty cycle.

11. The converter as claimed in claim 6, wherein the current generator comprises a digital circuit adapted to receive a voltage value and to generate a digital value proportional to an inverse of a square root of the voltage value.

12. A method of regulating an output voltage of a converter comprising:
providing a switch operable between a first state for opposing a decrease in the output voltage and a second state for opposing an increase in the output voltage;
determining a time period during which the output voltage keeps decreasing, wherein during the time period the switch is in the first state;
calculating a time to turn the switch from the first state to the second state to prevent the output voltage increasing above a reference value; wherein the converter has a duty cycle, and wherein the time to turn the switch to the second state is based on a product of a square root of the duty cycle and the time period; and
switching the switch to the second state at the calculated time.

13. The method as claimed in claim 12, wherein detecting the time period comprises detecting a gradient of the output voltage.

14. The method as claimed in claim 13, wherein detecting a gradient comprises detecting a negative gradient of the output voltage and detecting a positive gradient of the output voltage.

15. The method as claimed in claim 12, wherein calculating the time comprises generating a current proportional to a square root of an input current.

16. The method as claimed in claim 15, wherein the current generator comprises
an input current generator for generating the input current;
an operational amplifier adapted to control an output switch; and
a current mirror coupled to an input of the operational amplifier.

17. The method as claimed in claim 16, wherein the current mirror comprises a first transistor and a second transistor, and wherein a size of the second transistor is four times as large as a size of the first transistor.

18. The method as claimed in claim 12, wherein calculating the time comprises generating a current proportional to an inverse of the square root of the duty cycle.

19. The method as claimed in claim 12, wherein calculating the time comprises receiving a voltage value and generating a digital value proportional to an inverse of a square root of the voltage value.

20. The method as claimed in claim 12, wherein the circuit comprises a memory device coupled to the switch, the memory device having a first input coupled to a first circuit, a second input coupled to a second circuit, and an output to output a signal to turn the switch to the second state.

21. The method as claimed in claim 20, wherein the second circuit comprises an input for receiving a signal proportional to the time period and an output to output a signal proportional to another time period based on the duty cycle of the converter.

22. The method as claimed in claim 21, wherein the second circuit comprises
a current generator, a capacitor coupled to the current generator, and
a comparator having an input coupled to the capacitor and an output coupled to a logic gate;
wherein the current generator is adapted to output a current to control a rate of discharge of the capacitor.

\* \* \* \* \*